Figure 1:
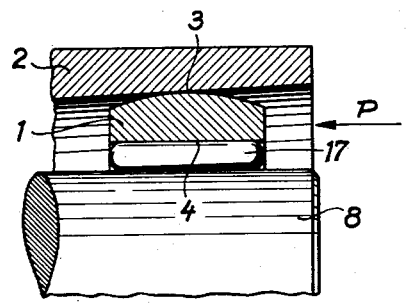

June 6, 1961  H. ABERLE  2,987,351
ANTI-FRICTION BEARINGS
Filed Dec. 10, 1958  2 Sheets-Sheet 1

United States Patent Office 2,987,351
Patented June 6, 1961

2,987,351
ANTI-FRICTION BEARINGS
Hans Aberle, Herzogenaurach, near Nurnberg, Germany, assignor to Industriewerk Schaeffler O.H.G., Herzogenaurach, near Nurnberg, Germany, a German company
Filed Dec. 10, 1958, Ser. No. 779,431
Claims priority, application Germany Dec. 23, 1957
12 Claims. (Cl. 308—207)

This invention relates to adjustable-clearance antifriction bearings, and is concerned principally with needle bearings.

It is a known aim with antifriction bearings to have only very small clearances in all working conditions as far as possible, and this has led to various methods of clearance adjustment. Conical surfaces which are displaced relatively to one another, or hydraulic means for constricting or opening out the race are particularly well known. In the case of races constructed as elastic elements, raceways are given various amounts of convexity depending on the amount of axial adjustment.

Conical surfaces have the great disadvantage that the angles of taper of the journal and bore in practice do not coincide. Errors in the taper angle give the race conical surfaces. This is very disadvantageous for cylindrical roller elements and particularly for long roller elements such as bearing needles.

In order to avoid errors in alignment, which may result from axial displacement of conical adjusting sleeves relatively to one another, it has also been proposed to use self-aligning ball bearings.

According to the present invention there is provided an antifriction bearing comprising a sleeve having a circumferential surface of conical form, and an annular race having around one radial side an endless circumferential raceway for a circumferential series of roller elements, said annular ring having intermediate the axial ends thereof a portion which, in axial section, is of increased radial thickness to define, around the other radial side of the race, an endless circumferentially extending abutment surface engageable with the conical surface of the sleeve upon relative axial displacement of the sleeve and race for varying the diameter of the raceway.

If clearance adjustment is carried out by varying the raceway diameter of an outer race, the procedure is, for example, that the raceway diameter of the outer race is narrowed by pressing its convex outer peripheral surface into a conical sleeve.

If clearance adjustment is carried out by varying the raceway diameter of an inner race, the procedure is that the raceway diameter of the inner race is widened by pressing its convex inner peripheral surface on to a conical surface.

Since in machine construction it is preferred to have cylindrical bores in housings, the use of a sleeve provided with a conical outer or inner peripheral surface affords particular advantages as regards assembly.

It is therefore proposed for sleeves having a conical bore and a cylindrical peripheral surface, into which the e.g. convex outer surface of an outer race is pressed, to be inserted themselves with a close sliding fit externally in a housing, and that when the convex race is pressed into the conical inner surface of the sleeve the latter is simultaneously expanded outwardly and thus a tight fit in the cylindrical bore of the housing is achieved.

When using an inner race, it is proposed to provide an externally conical sleeve with a bore which is slightly larger than the shaft diameter, so that when the convex inner surface of an inner race is pressed on to the conical surface the inner diameter of the sleeve is narrowed until a tight fit on the shaft is achieved.

The aforesaid constructional forms permit not only advantageous assembly conditions, but also simple dismantling, since displacement of the convex inner race on the sleeve loosens the fit of the cylindrical peripheral surface in the housing or on the shaft and thus the parts can be demounted without any force having to be applied.

Several advantages are obtained from the particular form, externally approximately centrally of the raceway, of a maximum diameter in the case of an outer race and of a minimum diameter in the case of an inner race, and from the application of pressure at this part. The cross-section diminishing towards both ends provides approximately the same diameter variation over the entire length of the raceway. This variation can be so effected by appropriate choice of the reduction in wall thickness, as to produce a slightly convex raceway. The wall thickness which diminishes towards the ends and which, for example, is not rigidly supported, can yield to edge loading of the bearing needles, so that relatively high edge compression is avoided and the known peak stresses occurring at the ends of cylindrical rolling elements are substantially reduced.

If the maximum or minimum peripheral surface diameter of a race is circular, a large radius will be preferred in order to obtain the widest possible bearing surface. Careful treatment of the peripheral surface can be limited to the central load-supporting portion of the peripheral surface at the time of pressing. For example, for manufacturing reasons the peripheral surface can be stepped towards the sides, or the sides can be so shaped as to provide a particularly advantageous raceway form at constriction or expansion, or so that the edge loading is particularly small when the race is subjected to load.

In order to simplify the fitting in position of such races which support load only in their central portion, and to secure them against rotation, it is proposed that the peripheral surface of the race near the maximum outer diameter or minimum inner diameter be covered with deformable materials at least at the end of the race. If the plastically and elastically deformable material is worked to correspond to the cone of the sleeve near the ground, more particularly convex, central surface, said material is given a pre-tension when pressed in against the cone which, owning to the frictional value and the surface area provided, provides a security against the risk of the race being displaced. The material is expediently so chosen that its pre-tension supports some of the load occurring in the bearing. As a result, the unilateral shifting of the race axis which would otherwise be expected owing to the deformation of the rounded zone, is reduced. If oil-containing materials such as e.g. sintered metals are used, the lubrication provided prevents the formation of frictional rust even with slight displacement of the race.

Generally speaking the punctiform contact of the peripheral surface of the race, which partly merges into linear contact owing to pressure application, entails the difficulty that in the event of radial loading occurring owing to the elastic property of the material by virtue of the radial load the shaft axis is displaced and the rigidity of the bearing and its accuracy of guiding suffer thereby. By way of remedy, it has already been proposed to provide the races at least at their ends with deformable materials which are force-fitted relatively to the conical surface, but whose pre-tension is less than edge pressure which may eventually occur at the roller elements. Fundamental assistance can be provided by giving the e.g. convex-wall race such a pre-tension by pressure application that the specific areal pressure from the pre-tension is greater than the specific areal pressure caused by the maximum radial load which can be expected. This can be achieved in a simple manner in that, for example, in the case of an outer race the envelope circle diameter or bearing clearance is chosen to be substantially wider than in the working condition. The race can thus be pressed very strongly into the conical or concave sleeve and thus considerable radial pressure application can be obtained. The compressive stress occurring at the same time at the raceway affords further advantages for the load-supporting capacity of the bearing; with inner races, on the other hand, care must be taken in order that the tensile stresses occurring in the raceway do not become too great.

Figure 2:
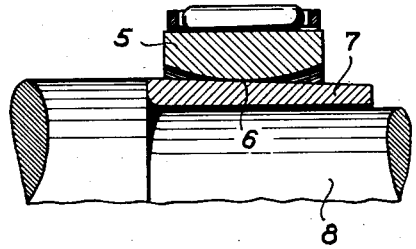
Figure 3:
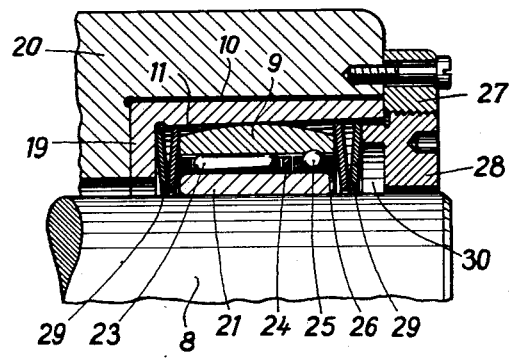
Figure 4:
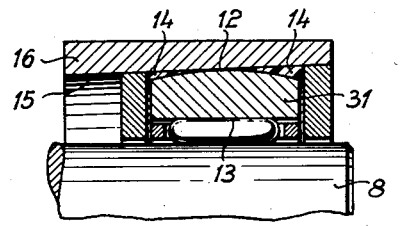
Figure 5:
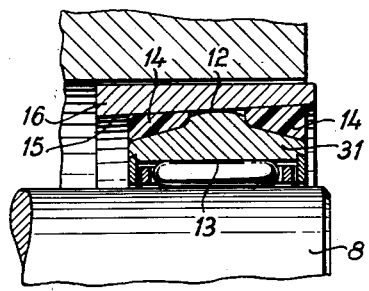
Figure 6:
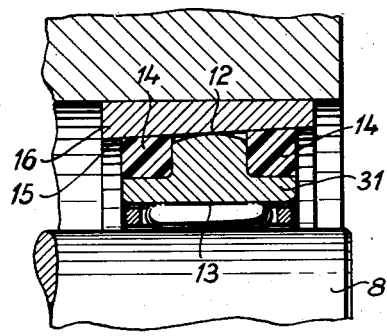

For a better understanding of the invention and to show how the same may be carried into effect, reference will now be made to the accompanying drawings in which:

FIGURE 1 is an axial section of an outer race having a convex outer surface, in an internally conical sleeve, FIGURE 2 is an axial section of a convex inner race on an externally conical sleeve, FIGURE 3 is an axial section of a bearing incorporating an outwardly convex race, FIGURE 4 is an axial section of an outwardly convex race with lateral covering in a conical sleeve, FIGURE 5 is an axial section of an outwardly stepped race with lateral covering in a conical sleeve, and FIGURE 6 is an axial section of an externally specially stepped race in a conical sleeve.

FIGURE 1 of the drawings illustrates a roller bearing comprising an annular outer race 1 having around the radially inner side thereof a circumferential raceway 4 for rollers 17 arranged between the raceway 4 and a shaft 8. The radially outer side of the race 1 is, in axial section, convex and defines equidistantly between the axial ends of the race a circumferentially extending abutment surface at the radially thickest portion of the race 1, i.e. where the diameter of the race 1 is greatest. The bearing also comprises a sleeve 2 having around the radially inner side thereof a circumferential surface of conical form and having around the radially outer side thereof a circumferential surface of cylindrical form. Assembly of the bearing is obtained by pressing the race 1 through the wider opening of the sleeve 2 along the shaft 8 in the direction of arrow P until the abutment surface of the convex surface of the race 1 engages the conical surface of the sleeve 2 at 3. Depending on the extent of the axial displacement of the race 1 along the shaft 8 after engagement of the abutment surface with the sleeve 2 at 3, a more or less great radial force is applied by the sleeve 2 on the race 1 causing more or less great constriction of the raceway for varying the diameter of the raceway. This constriction serves to adjust the clearance between the raceway 4 and the shaft 8 whereby the rollers 17 can be appropriately positioned.

FIGURE 2 shows a corresponding bearing construction for an annular inner race 5 having around the radially inner side a convex surface, in axial section. The bearing also comprises a sleeve 7 mounted on a shaft 8. The sleeve is formed with a conically shaped radially outer surface and a cylindrically shaped radially inner surface, the diameter of the latter surface being dimensioned so as to engage over the shaft 8 with a close sliding fit. By pressing the race 5 axially over the sleeve 7 after engagement between the abutment surface of the race 5 and the conical surface of the sleeve 7 at 6, the diameter of the cylindrical surface of the sleeve 7 can be decreased to produce a tight fit between the sleeve 7 and the shaft 8. Simultaneously, the diameter of the raceway of the race 5 can be increased to adjust the clearance between co-operating raceways.

FIGURE 3 illustrates the construction of a bearing comprising an annular outer race 9 having a radially outer convex surface abutting medially between the axial ends of the race against the radially inner conical surface of a sleeve 11. The sleeve 11 is formed with a radially inward flange 19 at the end where the conical surface is of least diameter and is formed with a radially outer cylindrical surface so dimensioned as to slide with a close fit in a cylindrical recess formed in a housing 20 upon assembly, as indicated by the gap 10.

The outer race 9 co-operates with an annular inner race 21 formed with cylindrical surfaces on both radial sides, and mounted on a shaft 8. Between the raceways of the races 9 and 21 are positioned a series of rollers 23 held in place by a cage 24 and a series of balls 25 held in place by a cage 26 and by a circumferential groove formed in the raceway of the race 9.

The sleeve 11 is held in the recess of the housing 20 by a retaining ring surrounding the end of the shaft 8. The retaining ring is formed of two annuli, an outer annulus 27 fixed, as by screws, to the housing 20, and an inner annulus 28 threadably engaged with the outer annulus 27 and rotatable therein for axial displacement along the shaft 8. The races 9 and 21 are held in place by the spring action of two pairs of resilient dished washers 29 arranged back to back and co-operating at one axial end of the races with the flange 19 of the sleeve 11, and at the other axial end with a circular axial projection 30 integrally provided on the inside of the annulus 28.

By rotating the annulus 28 in one direction or the other, the races 9 and 21 can be displaced, in co-operation with the washers 29, axially along the shaft one way or the other. Thus, during mounting of the bearing, the diameter of the cylindrical surface of the sleeve 11 can be increased, by turning the annulus 28 in one direction, to close the gap 10 thereby producing a tight fit between the housing 20 and the sleeve 11, and the clearance between the races 9 and 21 for the roller elements can be suitably adjusted. For demounting purposes, the annulus 28 is rotated in the opposite direction and removed. The resilient washers 29 near the flange 19 are then free to displace the races 9 and 21 towards the annulus 27 and the race 9 disengages the sleeve 11 thereby making it possible to remove the bearing parts.

FIGURES 4, 5 and 6 show bearings having annular outer races of different axial section but which are generally similar to the bearing shown in FIGURE 1. In these three figures, the same reference numerals have been used to designate corresponding parts. Each bearing comprises a sleeve 16 formed with a radially inner conical surface 15, and a race 31 having a circumferential abutment surface on the radially outer side of the race engaging the conical surface of the sleeve 16 at 12, generally opposite centre 13 of the raceway, at the radially thickest part of the race. Each race 31 is provided with circumferential coverings 14 of deformable material, e.g. plastic material or sintered material, on opposite axial sides of the abutment surface between the latter and the axial ends of the race 31. The coverings 14 are adapted to the conical surface 15 of the sleeve 16 so that when each race 31 is mounted in its sleeve 16, the coverings 14 will engage the surface 15 over a substantial area and provide security against relative rotation between the race 31 and the sleeve 16 but will not influence the elasticity distribution in the axial sense.

Whereas in the illustrated embodiments of bearings having outer races, the races are shown to have an outer convex surface over at least a part of the axial length of the races, it will be appreciated that the surfaces of the radially outer side of each race on opposite axial sides of the abutment surface can taper axially away from the abutment surface and radially inwardly to define conical surfaces.

I claim:
1. An antifriction bearing comprising a sleeve having a circumferential surface of conical form, and an annular race having around one surface in the axial direction an endless circumferential raceway for a circumferential series of roller elements, said annular race having intermediate the axial ends thereof a portion which, in axial section, is of increased radial thickness to define, around the other surface in the axial direction of the race, an endless circumferentially extending abutment surface engageable with the conical surface of the sleeve upon relative axial displacement of the sleeve and race for varying the diameter of the raceway.

2. An antifriction bearing according to claim 1, wherein said abutment surface is contained in a diametral plane substantially equidistantly spaced from the planes containing the axial ends of the race.

3. An antifriction bearing according to claim 1, wherein the said other surface in the axial direction of the race is convex, in axial section through the race.

4. An antifriction bearing according to claim 1, further comprising circumferential coverings of deformable material on opposite axial sides of said abutment surface between the latter and the axial ends of the race.

5. An antifriction bearing according to claim 1, wherein the axial end portions of the race are of reduced radial thickness for imparting elasticity to the axial end portions of the raceway.

6. An antifriction bearing according to claim 1, wherein the race is pre-tensioned by pressure to an extent such that the specific areal pressure at the periphery due to the pre-tension is the same as or is greater than the specific areal pressure of a maximum radial load that has to be taken up by the bearing.

7. An antifriction bearing comprising a sleeve having around the inner side thereof a circumferential surface of conical form, and an annular outer race having around the inner surface thereof an endless circumferential raceway for a circumferential series of roller elements, said annular outer race having intermediate the axial ends thereof a portion which in axial section, is of increased radial thickness to define, around the radially outer side of the race, an endless circumferentially extending abutment surface engageable with the conical surface of the sleeve upon relative axial displacement of the sleeve and race for decreasing the diameter of the raceway.

8. An antifriction bearing according to claim 1, wherein the faces of said other surface of the race on opposite axial sides of the abutment surface taper axially away from the abutment surface in a radial direction, to define conical faces.

9. An antifriction bearing comprising a sleeve having around the outer side thereof, a circumferential surface of conical form, and an annular inner race having around the outer side thereof an endless circumferential raceway for a circumferential series of roller elements, said annular inner race having intermediate the axial ends thereof a portion of increased radial thickness to define, around the inner side of the race, an endless circumferentially extending abutment surface engageable with the conical surface of the sleeve upon relative axial displacement of the sleeve and race for increasing the diameter of the raceway.

10. An antifriction bearing according to claim 9, wherein the sleeve has around the inner side thereof, a circumferential surface of cylindrical form and is mounted on a shaft with a close sliding fit so that, upon the race being pressed over the sleeve, the diameter of the cylindrical surface of the sleeve is decreased, while the diameter of the raceway is increased, to produce a tight fit between the cylindrical surface of the sleeve and the shaft.

11. An antifriction bearing according to claim 9, wherein the surfaces of said inner side of the race on opposite axial sides of the abutment surface taper axially away from the abutment surfaces and radially outwardly to define conical surfaces.

12. An antifriction bearing comprising a housing having a cylindrical bore; a sleeve having around the radially outer side thereof a circumferential surface of cylindrical form dimensioned radially for engaging the cylindrical bore of the housing with, upon insertion, a close sliding fit, and having around the inner surface thereof a circumferential surface of conical form; and an annular race having around the radially inner surface thereof an endless circumferential raceway for a circumferential series of roller elements, said annular outer race having intermediate the axial ends thereof a portion which, in axial section, is of increased radial thickness to define, around the outer surface of the race, an endless circumferentially extending abutment surface engageable with the conical surface of the sleeve so that upon insertion of the sleeve in the housing and upon the race being pressed into the sleeve, the diameter of the cylindrical surface of the sleeve is increased to produce a tight fit between the cylindrical surface of the sleeve and the cylindrical bore of the housing, and the diameter of the raceway is decreased.

References Cited in the file of this patent

UNITED STATES PATENTS

| | | |
|---|---|---|
| 634,898 | Miller | Oct. 17, 1899 |
| 903,337 | Springer | Nov. 10, 1908 |
| 1,075,204 | Fleming | Oct. 7, 1913 |
| 1,329,720 | Meier | Feb. 3, 1920 |
| 2,062,290 | Bott | Dec. 1, 1936 |
| 2,092,291 | Olsen | Sept. 7, 1937 |
| 2,295,139 | Topanelian | Sept. 8, 1942 |
| 2,659,637 | Barr | Nov. 17, 1953 |
| 2,702,730 | Ivanoff et al. | Feb. 22, 1955 |
| 2,804,358 | Karl-Erik Eriksson | Aug. 27, 1957 |

FOREIGN PATENTS

| | | |
|---|---|---|
| 513,495 | France | Nov. 3, 1920 |